(12) United States Patent
Jain et al.

(10) Patent No.: US 7,099,735 B2
(45) Date of Patent: Aug. 29, 2006

(54) METHOD AND APPARATUS TO CONTROL THE TEMPERATURE OF A MEMORY DEVICE

(75) Inventors: Sandeep K. Jain, Milpitas, CA (US); George Vergis, Hillsboro, OR (US); Animesh Mishra, Pleasanton, CA (US); Jun Shi, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 52 days.

(21) Appl. No.: 10/882,546

(22) Filed: Jun. 30, 2004

(65) Prior Publication Data
US 2006/0004537 A1    Jan. 5, 2006

(51) Int. Cl.
*G01K 1/00* (2006.01)
*G01K 1/08* (2006.01)
*G06F 7/00* (2006.01)

(52) U.S. Cl. .................. 700/132; 702/130; 700/299
(58) Field of Classification Search .......... 702/130, 702/132, 136; 700/299; 365/211; 374/100, 374/101, 141
See application file for complete search history.

(56) References Cited

U.S. PATENT DOCUMENTS

2004/0267409 A1*  12/2004  De Lorenzo et al. ....... 700/299

* cited by examiner

*Primary Examiner*—John Barlow
*Assistant Examiner*—Meagan S Walling
(74) *Attorney, Agent, or Firm*—Blakely, Sokoloff, Taylor & Zafman LLP

(57) ABSTRACT

In one embodiment a memory controller is provided. The memory controller comprises a predictive logic circuit to predict an increase in a current operating temperature of a memory device coupled to the memory controller, based on memory cycles to be issued to the memory device; and a temperature control circuit to perform a temperature control operation wherein if the sum of the current operating temperature and the predicted increase in temperature is greater than a threshold temperature associated with the memory device, then the number of memory cycles issued to the memory device is reduced.

16 Claims, 3 Drawing Sheets

METHOD AND APPARATUS TO CONTROL THE TEMPERATURE OF A MEMORY DEVICE

FIELD OF THE INVENTION

Embodiments of the invention relate to memory devices and in particular to a method and apparatus for controlling the operation of a memory device.

BACKGROUND

For reliable operation a memory device such as a dynamic random access memory (DRAM) device, a synchronous random access memory (SRAM) device, or a double data rate dynamic random access memory (DDR DRAM) device) must operate below a certain threshold temperature, above which failure of the memory device may occur. For example, if the threshold temperature is exceeded, then a memory device may lose data because of increased capacitor leakage due to the increased temperature. Further, the device may experience timing failures above the threshold temperature. Thus, the operating temperature of a memory device should be controlled to ensure that it does not exceed the threshold temperature.

DETAILED DESCRIPTION

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Figure 1:
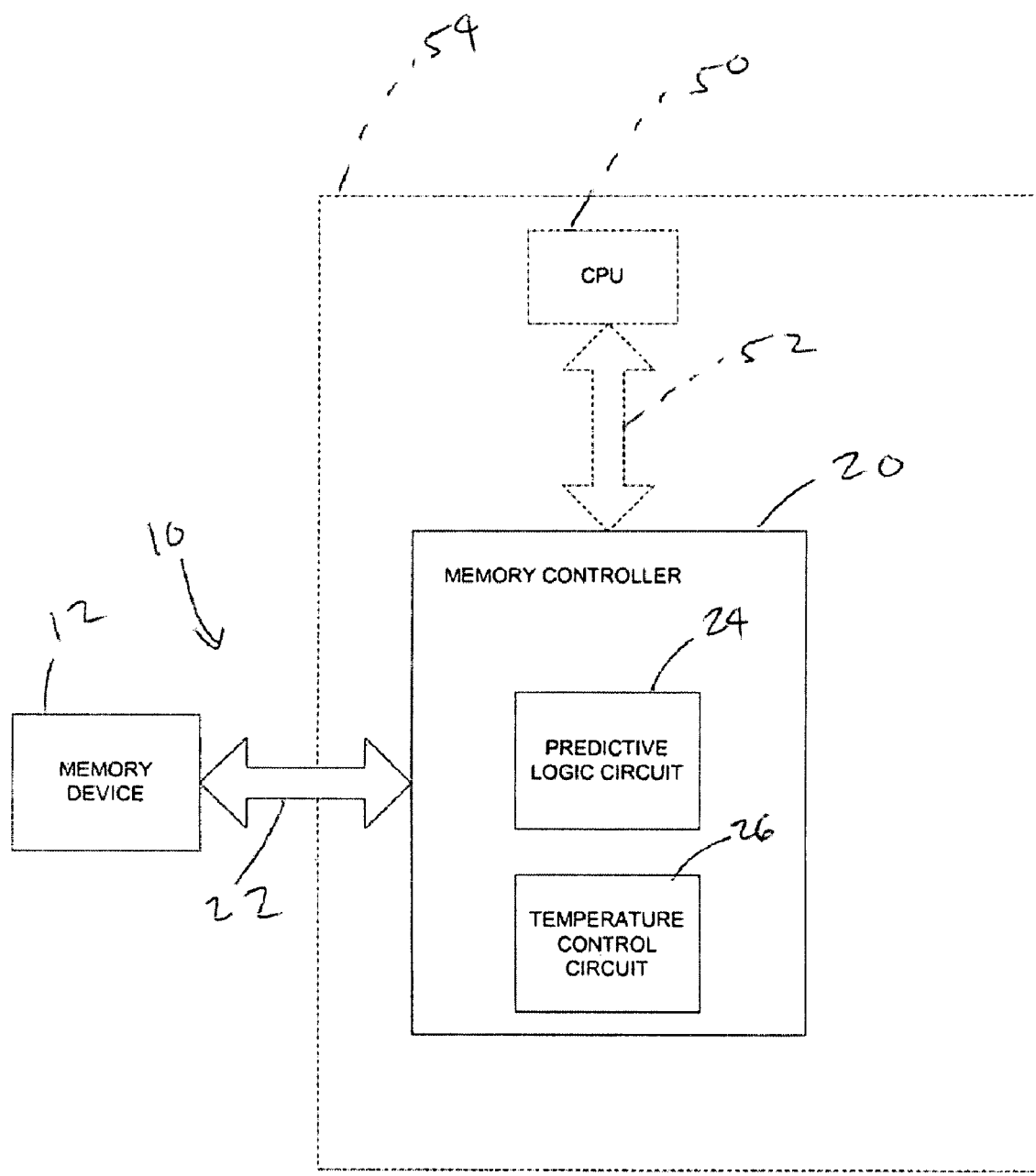
FIG. 1 shows a high-level block diagram of a system which includes a memory device, and a memory controller, in accordance with one embodiment of the invention.

FIG. 1 of the drawing shows a high-level block diagram of a system 10, in accordance with one embodiment of the invention. The system 10 includes a memory device 12 which is coupled to a memory controller 20 via a communications path 22, which in accordance with one embodiment of the invention may include a bus.

Figure 2:
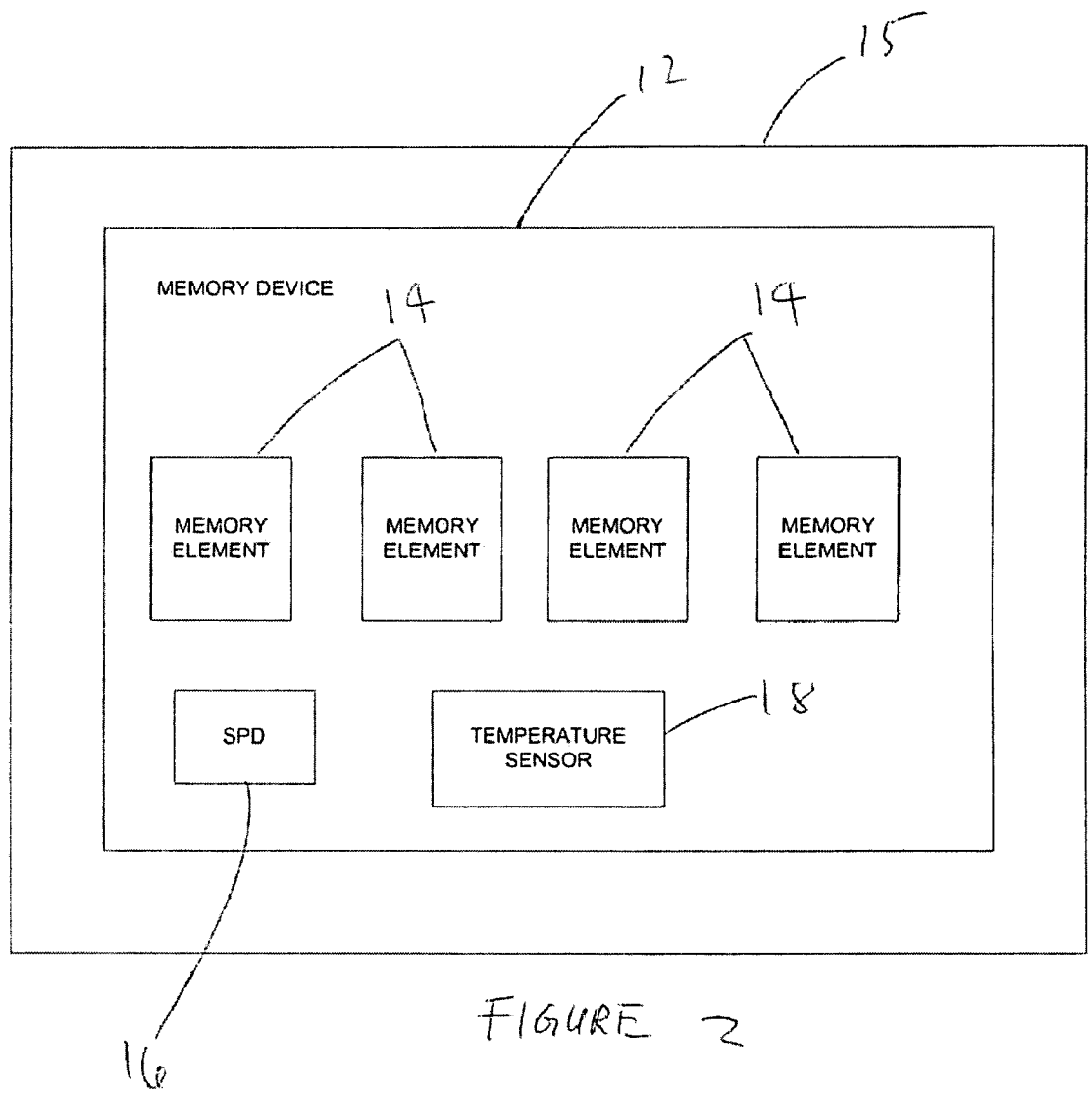
FIG. 2 shows a high-level block diagram of the memory device of FIG. 1, in greater detail.

In accordance with one embodiment of the invention, the memory device 12 may include the architecture shown in FIG. 2 of the drawings. Referring to FIG. 2, it will be seen that the memory device 12 includes a plurality of memory elements 14, only four of which have been shown in FIG. 2. The memory elements 14 may be architected in accordance with any memory technology, and may for example be DRAM elements, SRAM elements, DDR DRAM elements, etc. In one embodiment, a number of memory devices 12 may be coupled to form an array of memory devices 12 mounted on a printed circuit board (PCB) 15. The memory device 12 includes a serial presence detect (SPD) device 16 which is essentially an electrically erasable programmable read only memory (EEPROM) device that stores critical parameter information about the memory elements 14. For example, these parameters may include memory type, size, speed, voltage interface, number of row addresses, column addresses, element banks, and other critical information. The parameter information is sent over the communications path 22 to the memory controller 20 in order to facilitate configuration of the system 10. As will be seen, the memory device 12 also includes a temperature sensor 18, which in accordance with embodiments of the invention, senses the temperature of the memory elements 14 and sends the sensed temperature over the communications path 22 to the memory controller 20, as will be described in greater detail below.

Referring back to FIG. 1 of the drawings, the components of the memory controller 20 include a predictive logic circuit 24, and a temperature control circuit 26. The operation of the circuits 24, and 26 will be described in greater detail below.

In accordance with one embodiment of the invention, the memory device 12, and the memory controller 20 perform a method to facilitate active thermal management of the memory device 12. In this embodiment, the temperature sensor 18, is used to measure a base temperature of the memory elements 14 of the memory device 12. This base temperature is then used as a starting operating temperature for the memory device 12. The memory controller 20 tracks the memory activity of the memory device 12. Based on the duration and the nature of the memory activity, the memory controller 20 predicts a change in temperature for the memory device 12. The measured base temperature is then combined with the predicted increase in temperature in order to trigger the temperature control circuit 26 to actively manage or control the temperature of the memory device 12. For example, if the sum of the measured base temperature and the predicted increase in temperature for the memory device 12 exceeds a certain threshold temperature associated with the memory device 12, then the temperature control circuit 26 takes appropriate corrective action in order to reduce the temperature of the memory device 12. The threshold temperature is a temperature specified by a manufacturer of the memory device 12 and defines the maximum operating temperature for the memory device 12, without failure.

In one embodiment, the following formula is used for determining the current operating temperature of the memory device 12:

$$T_n = T_{n-1} + \Delta T,$$

Where $T_n$=predicted temperature at time $t_n$, and $T_{n-1}$=the previous temperature at time $t_{n-1}$.

At time 0 (t0), $T_{n-1} = T_m + ER$, where $T_m$ is the measured temperature from the thermal sensor 18, and ER is the steady state temperature error between the memory element 14, and the temperature sensor 18.

If the temperature sensor 18 is located on the memory elements 14 themselves, then ER is negligible.

ΔT is equal to the predicted rise in temperature of the memory device 12 due to memory activity.

As noted above, the base temperature may be measured by the temperature sensor 18. The temperature sensor 18 may be located anywhere on the memory device 12. For example, the temperature sensor 18 may be located on a memory element 14. In one embodiment, a temperature sensor 18 may be located on each of the memory elements 14. The location and accuracy of the temperature sensor 18 has an effect on the accuracy and response time of the measured temperature $T_m$.

Under steady state conditions, the temperature sensor 18 takes periodic temperature measurements and sends these measurements to the memory controller 20. In order to achieve a steady state reading temperature, in one embodiment, the temperature sensor 18 is configured to wait a few minutes, for example five minutes, after the memory device 12 transitions from a sleep state, before reading the temperature of the memory device 12.

Figure 3:
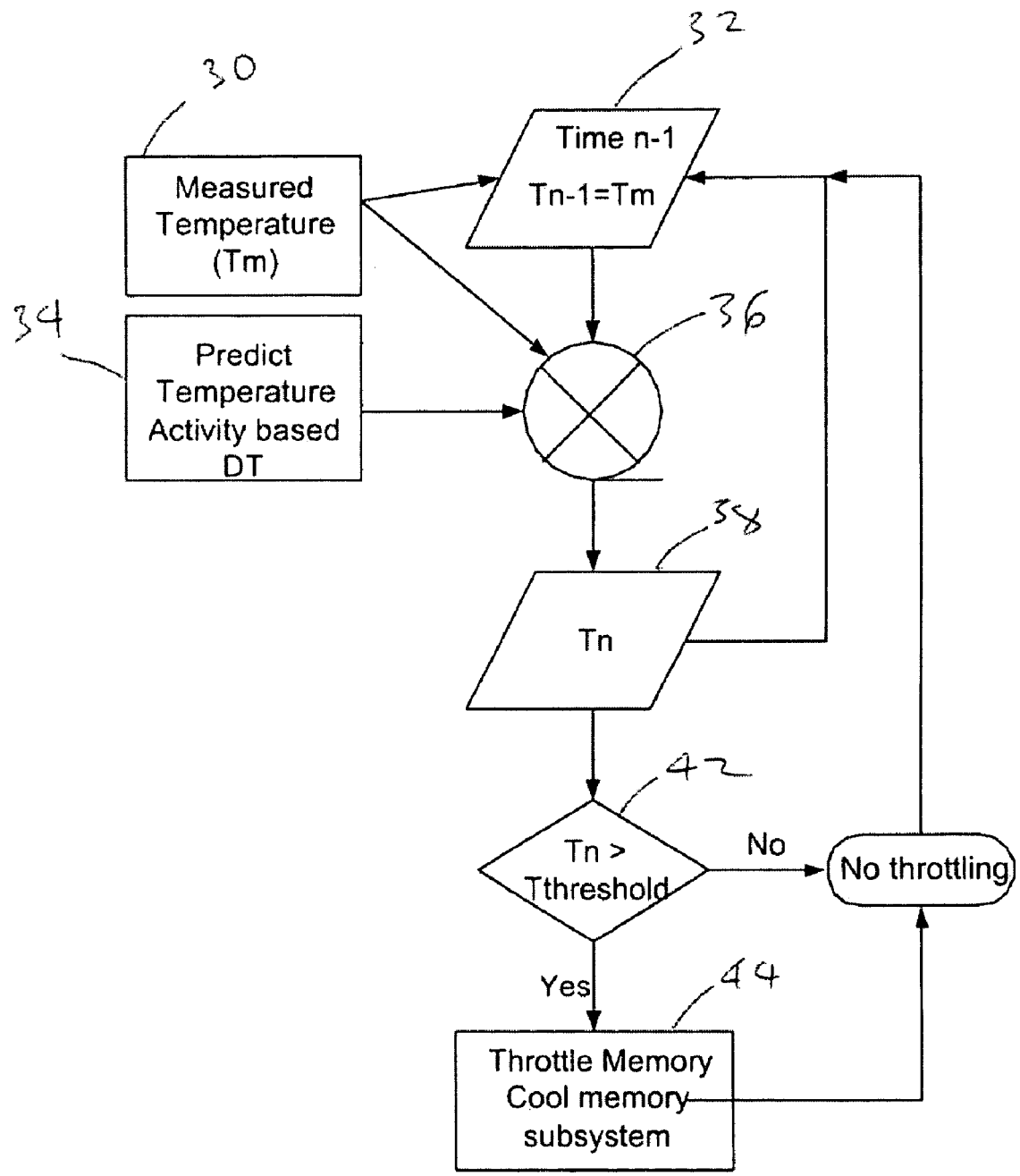
FIG. 3 shows a flowchart of operations performed by the memory controller of FIG. 1, in accordance with one embodiment of the invention.

Referring now to FIG. 3 of the drawings, there is shown a flowchart of operations performed by the memory controller 20, in accordance with one embodiment of the invention, in order to control the operating temperature of the memory device 12. Referring to FIG. 3, in process 30, the memory controller 20 obtains the measured temperature $T_m$ from the memory device 12. In accordance with embodiments of the invention, the measured temperature $T_m$ may be obtained in a variety of ways. One possibility is that upon completion of each auto refresh memory cycle, the memory controller 20 may poll the memory device 12 in order to obtain a reading from the temperature sensor 18. Accordingly, a protocol may be set up between the memory controller 20, and the memory device 12, which includes a command which when issued by the memory controller 20 after completion of an auto refresh cycle will be interpreted by the memory device 12 as a request for a reading from the temperature sensor 18. Another possibility is that a memory device 12 may periodically generate an interrupt to enable the memory controller 20 to read the temperature sensor 18. The output of the process 30 is that at block 32 at time n-1, $T_{n-1}$ is set to $T_m$. As noted above, the measured temperature $T_m$ defines a base temperature for the memory device 12. Conveniently, the base temperature may be thought of, as the ambient temperature of the memory device 12.

In process 34, a change in the base or measured temperature $T_m$ is predicted based on memory cycle activity. The operation 34 is performed by the predictive logic circuit 24. In one embodiment, the predictive logic circuit 24 examines upcoming or pending memory cycles to be issued to the memory device 12 and predicts the change in temperature based on the nature of the memory cycles, and the number of memory cycles. In one embodiment, the predictive logic circuit 24 may use an algorithm that factors in the operating characteristics of the memory device 12, as provided by a manufacturer of the memory device 12. In process 36, the measured temperature $T_m$ is added to the predicted change in temperature ΔT to determine a temperature value at time $t_n$. This temperature value is labelled $T_n$ in block 38 of FIG. 3. In process 42, if $T_n$ is greater than the threshold temperature associated with the memory device 12, then process 44 executes, wherein the temperature control circuit 26 throttles or scales back memory activity in order to cool the memory device 12. Alternatively, if $T_n$ is less than the threshold temperature then no throttling is required.

Referring again to FIG. 1 of the drawings, it will be appreciated that a system 10 may itself form a subsystem for a larger system, for example in one embodiment, the larger system may include a central processing unit (CPU) 50 which is coupled to the memory controller 20 by means of a bus 52, to define a system 54.

What is claimed is:

1. A method, comprising:
   sensing a current operating temperature of a memory device;
   predicting an increase in the current operating temperature of the memory device based on memory cycles to be issued to the memory device; and
   if the sum of the current operating temperature and the predicted increase in temperature is greater than a threshold temperature associated with the memory device then reducing the memory cycles issued to the memory device,
   wherein sensing the current operating temperature comprises mounting a temperature sensor on the memory device, and sampling the temperature sensor at periodic intervals.

2. The method of claim 1, wherein reducing the memory cycles is to a point where the sum of the current operating temperature and a predicted increase in temperature of the memory device due to performing reduced memory cycles is less than or equal to the threshold temperature.

3. The method of claim 1, wherein sampling the temperature sensor comprises generating an interrupt in each periodic interval to enable a memory controller to read the temperature sensor.

4. The method of claim 1, wherein sampling the temperature sensor comprises reading the temperature sensor at the end of each of auto refresh memory cycle.

5. The method of claim 1, wherein sampling the temperature sensor comprises issuing a command to read the temperature sensor.

6. A memory controller, comprising:
   a predictive logic circuit to predict an increase in a current operating temperature of a memory device coupled to the memory controller, based on memory cycles to be issued to the memory device; and
   a temperature control circuit to perform a temperature control operation wherein if the sum of the current operating temperature and the predicted increase in temperature is greater than a threshold temperature associated with the memory device, then the number of memory cycles issued to the memory device is reduced,
   wherein the predictive logic circuit determines the current operating temperature by sampling a temperature sensor mounted on the memory device, at periodic intervals, and predicting the increase in the current operating temperature relative to each sampled current operating temperature.

7. The memory controller of claim 6, wherein the temperature control circuit reduces the memory cycles to a point where the sum of the current operating temperature and a predicted increase in temperature of the memory device due to performing the reduced memory cycles is less than or equal to the threshold temperature.

8. The memory controller of claim 6, wherein the temperature control circuit performs the temperature control operation once for each sample of the current operating temperature.

9. The memory controller of claim 6, wherein the predictive logic circuit samples the current operating temperature by issuing a command to the memory device to read the temperature sensor.

10. The memory controller of claim 9, wherein the command is issued immediately after an auto refresh command to the memory device.

11. A system, comprising:
a memory device having a temperature sensor mounted thereon; and
a memory controller coupled to the memory device, the memory controller including:
a predictive logic circuit to prevent an increase in a current operating temperature of a memory device coupled to the memory controller based on memory cycles to be issued to the memory device; and
a temperature control circuit to perform a temperature control operation, wherein if the sum of the current operating temperature and the predicted increase in temperature is greater than a threshold temperature associated with the memory device, then the number of memory cycles issued to the memory device is reduced.

12. The system of claim 11, wherein the temperature control circuit reduces the memory cycles to a point where the sum of the current operating temperature and a predicted increased in temperature of the memory device due to performing the reduced memory cycles is less than or equal to the threshold temperature.

13. The system of claim 11, wherein the predictive logic circuit determines the current operating temperature by sampling a temperature sensor mounted on the memory device at periodic intervals; and predicting the increase in the current operating temperature relative to each sampled current operating temperature.

14. The system of claim 13, wherein the temperature control circuit performs the temperature control operation once for each sample of the current operating temperature.

15. The system of claim 14, wherein the predictive logic circuit samples the current operating temperature by issuing a command to the memory device to read the temperature sensor.

16. The system of claim 15, wherein the command is issued immediately after an auto refresh command to the memory device.

* * * * *